(12) United States Patent
Yoon et al.

(10) Patent No.: US 7,463,477 B2
(45) Date of Patent: Dec. 9, 2008

(54) MIXED DISPERSANT, PASTE COMPOSITION AND DISPERSION METHOD USING THE SAME

(75) Inventors: Seon-mi Yoon, Yongin-si (KR); Eun-sung Lee, Yongin-si (KR); Jae-young Choi, Suwon-si (KR); Seul-ki Kim, Yongin-si (KR); Jong-gab Baek, Hwaseong-si (KR); Seo-ho Lee, Seoul (KR)

(73) Assignee: Samsung Electro-Mechanics Co., Ltd., Suwon-Si, Gyeonggi-Do (KR)

( * ) Notice: Subject to any disclaimer, the term of this patent is extended or adjusted under 35 U.S.C. 154(b) by 292 days.

(21) Appl. No.: 11/318,558

(22) Filed: Dec. 28, 2005

(65) Prior Publication Data

US 2007/0014074 A1 Jan. 18, 2007

(30) Foreign Application Priority Data

Jul. 15, 2005 (KR) ...................... 10-2005-0064159

(51) Int. Cl.
*H01G 4/06* (2006.01)

(52) U.S. Cl. .............. 361/321.1; 361/321.2; 361/321.4; 361/311; 361/313; 361/306.1

(58) Field of Classification Search .............. 361/321.1, 361/321.2, 321.4, 321.5, 311–313, 302–305, 361/306.1, 306.3; 501/136, 137
See application file for complete search history.

(56) References Cited

U.S. PATENT DOCUMENTS

| | | | |
|---|---|---|---|
| 4,486,813 A * | 12/1984 | Maher ..................... | 361/321.5 |
| 4,539,041 A | 9/1985 | Figlarz et al. | |
| 5,097,391 A * | 3/1992 | Nomura et al. .......... | 361/321.4 |
| 5,698,131 A * | 12/1997 | Saitou et al. ............. | 252/62.57 |
| 5,707,761 A * | 1/1998 | Hayashi et al. ............. | 429/206 |
| 6,120,576 A | 9/2000 | Toshima et al. | |
| 6,238,822 B1 * | 5/2001 | Imoto et al. .............. | 429/218.2 |
| 6,577,494 B2 * | 6/2003 | Watanabe et al. ........ | 361/321.2 |
| 7,054,137 B1 * | 5/2006 | Barber et al. ............ | 361/321.1 |

* cited by examiner

*Primary Examiner*—Nguyen T Ha
(74) *Attorney, Agent, or Firm*—Buchanan Ingersoll & Rooney PC

(57) ABSTRACT

A mixed dispersant which can improve the efficiency of dispersing metal powder by effectively adsorbing on the surface of the metal powder and preventing aggregation thereof, and a paste composition and a dispersion method using the same are provided. A multilayer ceramic capacitor (MLCC) is also provided. The mixed dispersant includes a basic dispersant and an acidic dispersant in accordance with the acidity and basicity of nickel metal powder and thus can achieve an optimal dispersion efficiency. An improvement in the dispersion efficiency as such can consequently suppress aggregation of the nickel metal powder during the preparation of a conductive paste composition containing a nickel metal powder, and therefore a larger amount of the nickel metal powder can be used in the paste composition. The increased amount of nickel metal powder allows producing an internal nickel electrode having improved electric properties and mechanical properties during the production of MLCCs.

20 Claims, 9 Drawing Sheets

US 7,463,477 B2

MIXED DISPERSANT, PASTE COMPOSITION AND DISPERSION METHOD USING THE SAME

CROSS-REFERENCE TO RELATED PATENT APPLICATION

This application claims the benefit of Korean Patent Application No. 10-2005-0064159, filed on Jul. 15, 2005, in the Korean Intellectual Property Office, the disclosure of which is incorporated herein in its entirety by reference.

BACKGROUND OF THE DISCLOSURE

1. Field of the Disclosure

The present disclosure relates to a mixed dispersant, and a paste composition and a dispersion method using the same, and more particularly, to a mixed dispersant which improves the efficiency of dispersing a metal powder by effectively adsorbing on the surface of the metal powder and preventing aggregation of the metal powder, and a paste composition and a dispersion method using the same. The present invention also relates to a multilayer ceramic capacitor (MLCC).

2. Description of the Related Art

A multilayer ceramic condenser (hereinafter, referred to as MLCC) is produced by laminating a plurality of dielectric thin layers and a plurality of internal electrodes. An MLCC with this structure has a large capacitance relative to its small volume, and thus, is widely used in a variety of electronic appliances such as, for example, personal computers and mobile telecommunication devices.

A silver-palladium (Ag—Pd) alloy has been used as the material for the internal electrode, which constitutes the MLCC. The silver-palladium alloy can be easily applied to the production of MLCCs since the alloy can be sintered even in the atmospheric air; however, the alloy is expensive and the economics are not favorable. In order to lower the cost of the MLCCs, there was an attempt in the latter half of 1990's to replace the silver-palladium alloy with inexpensive nickel for the material of the internal electrode. Accordingly, nickel electrodes are increasingly used as the internal electrodes of the MLCCs, and in this instance, the nickel internal electrodes are formed from a conductive paste containing nickel metal powder.

The nickel metal powder can be prepared by various preparative processes, and representative processes include a gas phase process and a liquid phase process. The gas phase process is widely used since it is relatively easy to control the morphology of the nickel metal powder and the presence of impurities, yet the process is disadvantageous in the aspects of particle size reduction and mass production. On the other hand, the liquid phase process is advantageous in that mass production is possible and the costs for facilities installation and operation maintenance are low, thus the process being used with favor. The liquid phase process is described in, for example, U.S. Pat. Nos. 4,539,041 and 6,120,576.

However, even when the nickel metal powder is produced by the liquid phase process or the gas phase process, upon the use of the nickel metal powder for the preparation of a conductive paste composition, a large quantity of the nickel metal powder cannot be used because the viscosity of the paste composition may be excessively high. Therefore, a method is known in which the nickel metal powder is dispersed in the paste composition by means of various kinds of dispersants. A dispersant in general exhibits its dispersing ability by adsorbing on the surface of metal powder and suppressing aggregation of the powder. Thus, in order to facilitate adsorption of the dispersant, a dispersant having a functional group which is effective for adsorption, that is, an acidic dispersant, has been used for the nickel metal powder that is basic in nature, so as to disperse the nickel metal powder in the paste. However, there remains a demand for a dispersant having an improved dispersing ability to achieve a satisfactory efficiency of dispersion and to increase the amount of the nickel metal powder contained in the paste composition.

SUMMARY OF THE DISCLOSURE

It is an aspect of the present disclosure to provide a mixed dispersant which can improve the efficiency of dispersing metal powder by effectively adsorbing on the surface of the metal powder and preventing aggregation thereof.

It is another aspect of the present disclosure to provide a metal paste composition containing the mixed dispersant.

It is another aspect of the present disclosure to provide a method of efficiently dispersing metal powder using the mixed dispersant.

It is yet another aspect of the present disclosure to provide a multilayer ceramic capacitor (MLCC) which contains a metal powder dispersed in the internal electrodes by the dispersion method.

BRIEF DESCRIPTION OF THE DRAWINGS

The above and other features and advantages of the present invention will be described in detailed exemplary embodiments thereof with reference to the attached drawings in which.

DETAILED DESCRIPTION OF EXEMPLARY EMBODIMENTS

Figure 1:
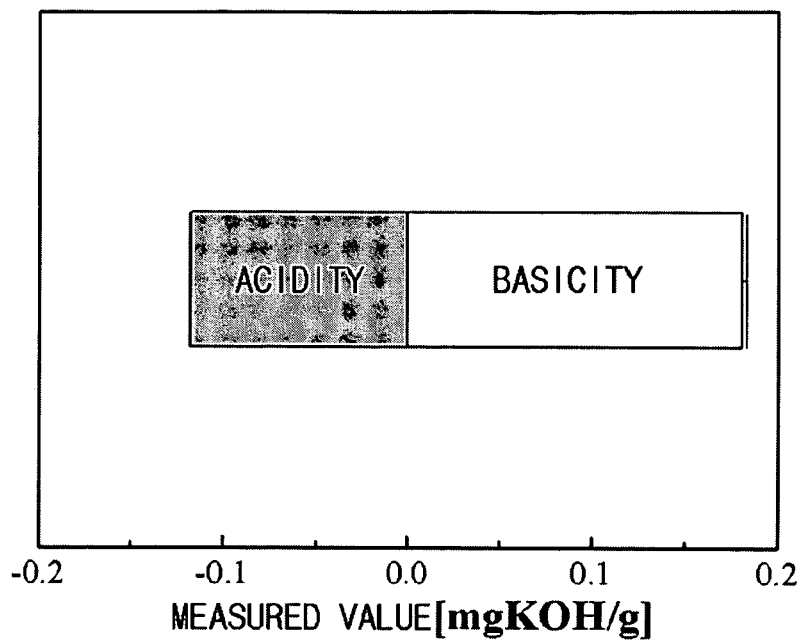
FIG. 1 is a graph showing the results for acid-base titration against the nickel powder surface.

In order to achieve the technical objects described above, the present invention provides a mixed dispersant which is characterized in containing a basic dispersant and an acidic dispersant in accordance with the acidity to basicity ratio at the surface of nickel metal powder.

According to an embodiment of the present invention, the amount ratio of the basic dispersant to the acidic dispersant in the mixed dispersant may be within the range of about ±30 equivalent % of the acidity to basicity ratio exhibited by the nickel metal powder surface.

According to an embodiment of the present invention, the mixed dispersant may contain about 10 to 70 equivalent % of a basic dispersant and about 30 to 90 equivalent % of an acidic dispersant. More preferably, the mixed dispersant may contain approximately 20 to 60 equivalent % of a basic dispersant and about 40 to 80 equivalent % of an acidic dispersant, while most preferably, the mixed dispersant may contain about 30 to 50 equivalent % of the basic dispersant, and about 50 to 70 equivalent % of the acidic dispersant.

The basic dispersant may be an organic base having about 6 to 28 carbon atoms and an amine head group such as, for example, caprylamine, laurylamine, stearylamine or oleylamine.

The acidic dispersant may be a fatty acid having about 6 to 28 carbon atoms and a carboxyl head group such as, for example, capric acid, lauric acid, palmitic acid, stearic acid, myristoleic acid, palmitoleic acid, oleic acid, stearidonic acid or linolenic acid.

In order to achieve another technical object, the present invention provides a conductive paste composition which comprises a nickel metal powder, an organic binder, an organic solvent and a mixed dispersant, wherein the mixed dispersant contains a basic dispersant and an acidic dispersant in accordance with the acidity to basicity ratio at the metal surface.

The amount of the mixed dispersant used may be about 0.001 to 1 part by weight based on 100 parts by weight of the nickel metal powder.

In order to achieve another technical object, the present invention provides a method of dispersing nickel metal powder, which comprises dispersing the nickel metal powder by using a mixed dispersant that contains a basic dispersant and an acidic dispersant in accordance with the acidity and basicity at the surface of the nickel metal powder.

In order to achieve another technical object, the present invention may provide an MLCC having internal electrodes which contain a nickel metal powder dispersed therein by the dispersion method described above.

Hereinafter, the present invention will be described in more detail.

In general, the surface of nickel metal powder is basic on the whole, but essentially acidic parts and basic parts coexist. The present invention allows an improvement in the dispersing ability by using a mixed dispersant which takes into account of the acidic parts of the nickel metal powder.

The mixed dispersant according to an embodiment of the present invention contains a basic dispersant and an acidic dispersant in accordance with the acidity to basicity ratio at the nickel metal powder surface. In other words, when a dispersant having a basic functional group and a dispersant having an acidic functional group, which respectively have an appropriate amount of the functional group in accordance with the acidity or basicity at the nickel metal powder surface, are mixed at a predetermined ratio and used as a mixture, a superior dispersing ability compared to the instance where an acidic dispersant is used alone, is obtained.

When the surface of the nickel metal powder is analyzed by acid-base titration, the surface exhibits a certain ratio of acidity and basicity. When a basic dispersant and an acidic dispersant are mixed in accordance with the acidity and basicity of the nickel metal powder surface and used as a mixed dispersant, the basic dispersant acts on the acid parts of the nickel metal surface, while the acid dispersant acts on the basic parts of the nickel metal surface. Thus, the dispersants effectively adsorb on the nickel metal surface and suppress aggregation of the nickel metal powder particles. This suppression of aggregation permits the achievement of optimal dispersion efficiency.

According to an embodiment of the present invention, the amount ratio for the basic dispersant and the acidic dispersant in the mixed dispersant may be higher or lower by about 30 equivalent % than the acidity to basicity ratio at the nickel metal powder surface, preferably higher or lower by about 20 equivalent % than the acidity to basicity ratio, and more preferably higher or lower by about 10 equivalent % than the acidity to basicity ratio. For example, when the acidity to basicity ratio at the surface of the nickel metal powder is 40:60, the proportion of the basic dispersant in the mixed dispersant according to the present invention may be in the range of about 10 to 70 equivalent %, preferably in the range of about 20 to 60 equivalent %, and more preferably in the range of about 30 to 50 equivalent %, whereas the proportion of the acidic dispersant may be in the range of about 30 to 90 equivalent %, preferably in the range of about 40 to 80 equivalent %, and more preferably in the range of about 50 to 70 equivalent %. The total amount of the basic dispersant and the acidic dispersant may vary flexibly within the above-described range, with the sum of the amounts of the two dispersants being set to 100 equivalent %. When the total amount is beyond the above-mentioned range, the optimal dispersion efficiency cannot be achieved.

The unit "equivalent %" is used herein to express the ratio of the amounts of the acidic dispersant and the basic dispersant, which are the constituting components contained in the mixed dispersant of the invention, and the unit indicates the relationship of the amounts of the acidic dispersant and the basic dispersant in the mixed dispersant. The "equivalent %" expresses the equivalent ratio of the two components in terms of percentage. That is, when 0.6 moles of an acidic dispersant having a monovalent acidic functional group and 0.4 moles of a basic dispersant having a monovalent basic functional group are mixed, the equivalent % values of the two components are 60 equivalent % and 40 equivalent %, respectively.

The basic dispersant that can be used in the present invention is not limited as long as it is used in the pertinent art, and the basic dispersant may be an organic base having about 6 to 28 carbon atoms and an amine head group, for example, caprylamine, laurylamine, stearylamine or oleylamine being preferred.

The acidic dispersant that can be used in the present invention is not limited as long as it is used in the pertinent art, and the acidic dispersant may be a fatty acid having about 6 to 28 carbon atoms and a carboxyl head group, for example, capric acid, lauric acid, palmitic acid, stearic acid, mystoleic acid, palmitoleic acid, oleic acid, stearidonic acid or linolenic acid being preferred.

The mixed dispersant according to an embodiment of the present invention as described above can improve the dispersing ability of the nickel metal powder and suppress aggregation of the metal powder particles, and thus, is useful for conductive paste compositions. The conductive paste composition according to an embodiment of the present invention contains a nickel metal powder, an organic binder, and an organic solvent. The mixed dispersant of the present invention is further added to the paste composition. The mixed dispersant contains a basic dispersant and an acidic dispersant in accordance with the acidity to basicity ratio at the metal surface as described above.

The conductive paste composition according to an embodiment of the present invention can employ conventionally known ingredients that are used for the nickel internal electrode of an MLCC, for the components other than the dispersant, while the conductive paste composition of the invention employs the mixed dispersant of the present invention.

The nickel metal powder used in the paste composition of the present invention can be prepared by a variety of known methods, including the liquid phase method and the solid phase method. The size of the powder particle is also not limited. The organic binder that is suitable for use in the conductive paste composition may be ethylcellulose for example, while the organic solvent may be terpineol, dihydroxy terpineol (DHT), 1-octanol kerosene, or the like.

In the conductive paste composition according to an embodiment of the present invention, the amount of the nickel metal powder may be about 30 to 80% by weight, the amount of the organic binder may be about 0.5 to 20% by weight, and the amount of the organic solvent may be about 10 to 50% by weight. The mixed dispersant according to the present invention is added to the paste composition in an amount of about 0.001 to 1.0 part by weight based on 100 parts by weight of the nickel metal powder. When the amount of the mixed dispersant is less than about 0.001 part by weight, satisfactory dispersion cannot be achieved, and when the amount of the mixed dispersant is more than 1 part by weight, the acidic dispersant and the basic dispersant in the mixed dispersant may bind with each other to undergo a neutralization reaction, thus resulting in undesirable side-effects due to the excessive amount of the mixed dispersant. In the relationship regarding the amounts of other materials, when the amount of the organic binder is less than about 1% by weight, the function of the binder is insufficient, and when the amount exceeds about 20% by weight, the viscosity is undesirably high. When the amount of the organic solvent is less than about 10% by weight, the viscosity is high, and when the amount exceeds about 50% by weight, the conductivity of the paste composition may be lowered.

However, the composition as described above is only an illustrative example of preferred embodiments, and it should be noted that a person having ordinary skill in the art would understand that the composition can be varied depending on the use of the paste composition. In particular, the mixed dispersant according to the present invention is advantageous in that the mixed dispersant allows an improvement in the dispersion efficiency and thus, allows using a larger amount of nickel metal powder without a significant increase in the paste viscosity.

The conductive paste composition according to the present invention can further contain additives such as, for example, a plasticizer, an anti-thickening agent, and other dispersants. The conductive paste composition of the present invention may be prepared by using any of various known methods.

According to another embodiment of the present invention, a dispersion method of dispersing nickel metal powder by using the mixed dispersant according to the invention is provided. The dispersion method comprises dispersing a nickel metal powder together with an organic binder in an organic solvent, using the mixed dispersant according to the present invention as described above. The advantage of the dispersion method is that aggregation of the nickel metal powder is maximally suppressed, and thus a large amount of the nickel metal powder can be used without an increase in the viscosity, as described above.

According to another embodiment of the present invention, provided is an MLCC having nickel internal electrodes, wherein the nickel internal electrodes contain a nickel metal powder dispersed by the above dispersion method. In view of the characteristics of an electrode, since a nickel internal electrode having a dense structure is excellent in the electric properties or mechanical properties, an electrode containing as much of the nickel metal powder as possible is preferred. The nickel internal electrode containing a nickel metal powder which is dispersed by the dispersion method of using the mixed dispersant according to the present invention is such that, the electrode-forming paste can contain a larger amount of the nickel metal powder compared to conventional nickel internal electrodes, at a high concentration without an increase in the viscosity, while containing the same amounts of an organic solvent and an organic binder. As a result, the nickel internal electrode obtained by applying and sintering the paste has improved quality. That is, when the degree of filling of the electrode-forming nickel metal powder increases, breakage of the electrode or reduction in the electric resistance can be suppressed, and damage in the electrode due to an external shock can be prevented.

Figure 10:
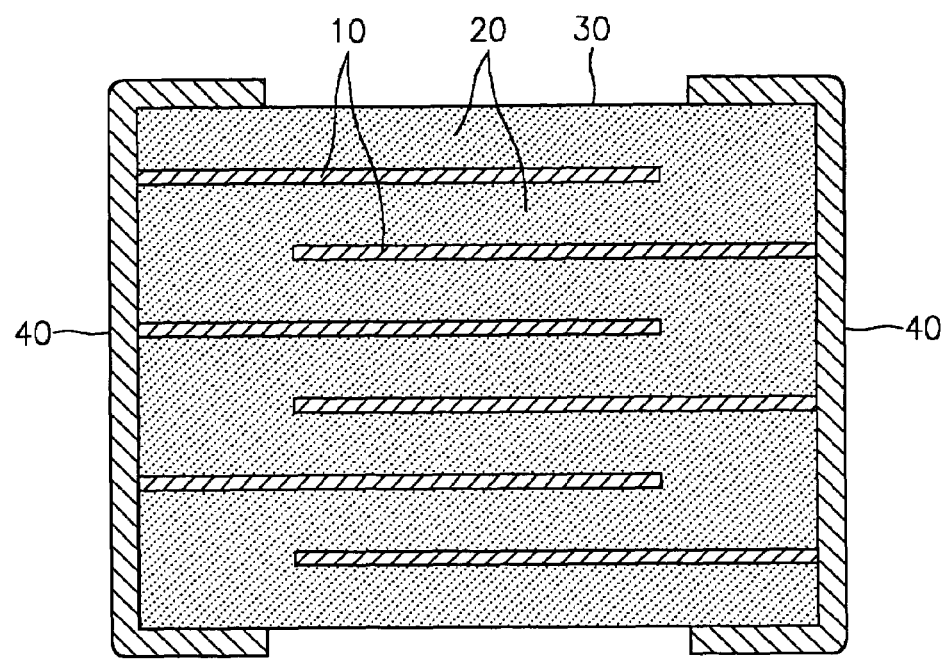
FIG. 10 is a diagram illustrating a multilayer ceramic capacitor according to an embodiment of the present invention.

FIG. 10 illustrates an MLCC according to an embodiment of the present invention. The MLCC shown in FIG. 10 consists of a laminate 30 composed of internal electrodes 10 and dielectric layers 20, and terminal electrodes 40. The internal electrodes 10 are formed such that the electrode tips are exposed from one side of the laminate 30 so as to be in contact with the terminal electrode at either side.

An exemplary method of producing the MLCC of the present invention is set forth hereafter. A paste for the formation of dielectric layers which contains a dielectric material, and the conductive paste of the present invention are printed alternately. The resulting laminate is sintered. The conductive paste is applied to the cross-sections of the laminate 30 so that the tips of the internal electrodes 10 which are exposed from the cross-sections of the sintered laminate 30, and the applied conductive paste are brought to electrical and mechanical bonding, and then the applied conductive paste is sintered to form terminal electrodes 40.

The MLCC according to the present invention is not limited to the embodiment illustrated in FIG. 10 and can have various morphologies, dimensions, layer numbers, circuit constitutions, and the like.

EXAMPLES

The present invention will now be described with reference to the following examples, which are for illustrative purposes only and are not intended to limit the scope of the present invention.

Acidity measurement by acid-base titration

The acidity and basicity of the surface of a nickel metal powder (average particle size: 300 nm, supplier: Shoei Co., Ltd., product name: Ni670S) were measured by acid-base titration, and the results are presented in FIG. 1. The acidity (mg KOH/g) was 0.117 (6.552 mmol/g Ni), and the basicity (mg KOH/g) was 0.181 (10.136 mmol/g Ni). Thus, the acidity to basicity ratio was about 40:60 equivalent %.

Example 1

0.025 part by weight of oleic acid and 0.025 part by weight of oleylamine, based on 100 parts by weight of the nickel metal powder to be introduced, were added to 18.16 g of dihydroxy terpineol (DHT) to form a liquid mixture, and then 58.4 g of the nickel metal powder (average particle size: 300 nm, supplier: Shoei Co., Ltd., product name: Ni670S) were added to the liquid mixture. Subsequently, the nickel metal powder was dispersed therein with a ball mill to produce a dispersion.

Example 2

A dispersion was prepared in the same manner as in Example 1, except that the amounts of the oleic acid and the oleylamine when the amount of the introduced dispersant was 0.05 part by weight based on 100 parts by weight of the nickel metal powder, were set to 100:0, 70:30, 60:40, 50:50, 40:60, 30:70 and 0:100 (unit: equivalent %), respectively.

Example 3

A dispersion was prepared in the same manner as in Example 2, except that the amount of the mixed dispersant containing oleic acid and oleylamine was 0.1 part by weight based on 100 parts by weight of the nickel metal powder.

Example 4

0.025 part by weight of oleic acid and 0.025 part by weight of oleylamine, based on 100 parts by weight of the nickel metal powder to be introduced, were added to an organic solution formed by mixing 15 g of DHT and 1.6 g of ethylcellulose (EC) to form a liquid mixture, and then 27.93 g of the nickel metal powder (average particle size: 300 nm, supplier: Shoei Co., Ltd., product name: Ni670S) were added to the liquid mixture. Subsequently, the nickel metal powder was dispersed therein with a ball mill to produce a conductive paste composition.

Comparative Example 1

A dispersion was prepared in the same manner as in Example 1, except that no dispersant was used.

Comparative Example 2

A dispersion was prepared in the same manner as in Example 1, except that 0.01, 0.05, 0.1, 0.5, 1.0, 2.0 and 3.0 parts by weight of oleic acid were used as the dispersant based on 100 parts by weight of the nickel metal powder.

Comparative Example 3

A dispersion was prepared in the same manner as in Example 1, except that 0.01, 0.05, 0.1, 0.5, 1.0, 2.0 and 3.0 parts by weight of oleylamine were used as the dispersant based on 100 parts by weight of the nickel metal powder.

Comparative Example 4

A dispersion was prepared in the same manner as in Example 1, except that 0.01, 0.05, 0.1, 0.5, 1.0, 2.0 and 3.0 parts by weight of oleyl alcohol were used as the dispersant based on 100 parts by weight of the nickel metal powder.

Comparative Example 5

A dispersion was prepared in the same manner as in Example 2, except that the amount of the mixed dispersant containing oleic acid and oleylamine was 1 part by weight based on 100 parts by weight of the nickel metal powder.

Comparative Example 6

0.05 part by weight of oleic acid, based on 100 parts by weight of the nickel metal powder to be introduced, were added to an organic solution obtained by mixing 15 g of DHT and 1.6 g of EC to form a liquid mixture, and then 27.93 g of the nickel metal powder (average particle size: 300 nm, supplier: Shoei Co., Ltd., product name: Ni670S) were added to the liquid mixture. Subsequently, the nickel metal powder was dispersed therein with a ball mill to produce a conductive paste composition.

Experimental Example 1

In order to evaluate the dispersing ability of the dispersants obtained in Comparative Examples 2 through 4 with respect to the amount of the dispersant, the viscosities of the dispersions were measured. The results are presented in FIG. 2. A Brookfield viscometer RVII was used for the measurement, and a No. 14 spindle of cylinder type was used. The temperature was 25° C.

Figure 2:
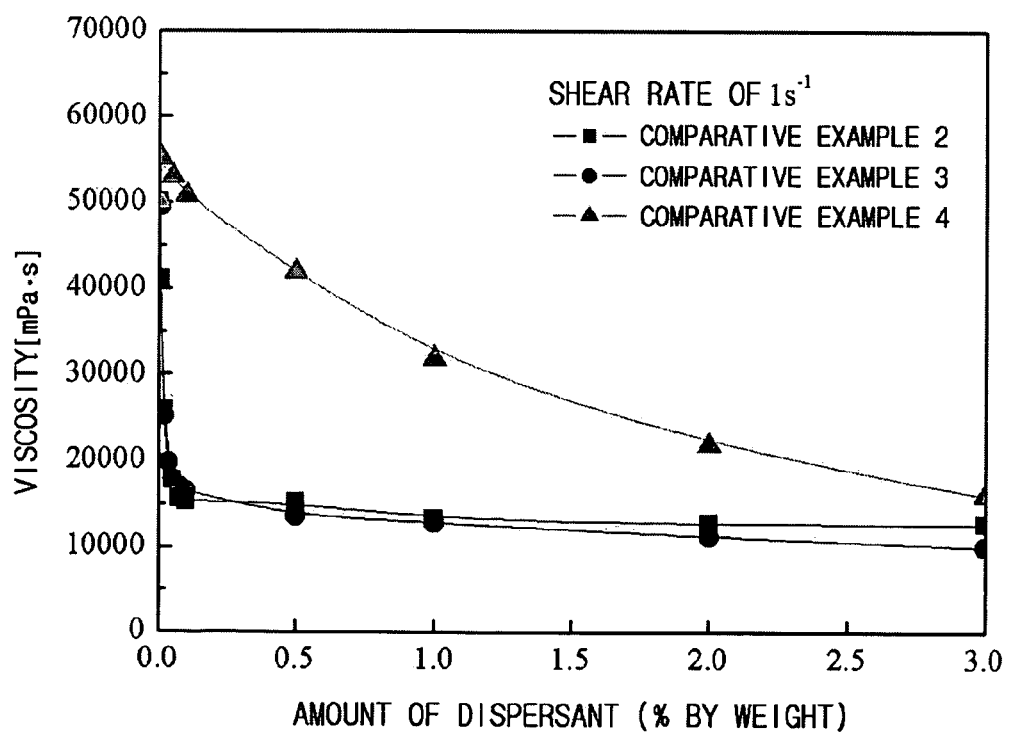
FIG. 2 is a graph showing changes in the viscosity of dispersions according to Comparative Examples 2 through 4 of the present invention, with the amount of the dispersant, when the shear rate of the nickel powder is 1.

As shown in FIG. 2, oleic acid and oleylamine exhibit dispersing effects even with small amounts of addition, in contrast to the oleyl alcohol that is neutral. When the amounts exceed 0.1% by weight, the dispersing effects of the oleic acid and oleylamine do not vary much.

Experimental Example 2

Figure 3:
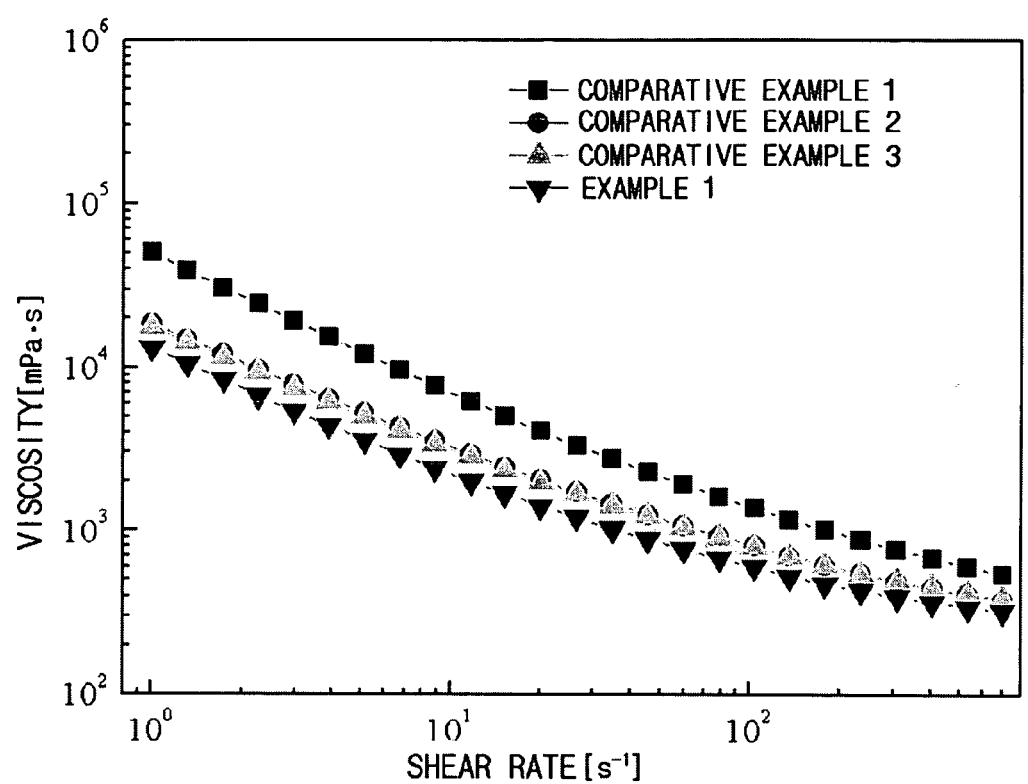
FIG. 3 is a graph showing changes in the viscosity of dispersions according to Example 1 and Comparative Examples 1 through 3 of the present invention, with the shear rate.

The viscosities of the dispersions prepared according to Example 1 (0.025 part by weight of oleic acid and 0.025 part by weight of oleylamine), Comparative Examples 1 and 2 (0.05 part by weight of oleic acid), and Comparative Example 3 (0.05 part by weight of oleylamine) with respect to the shear rate, were measured. The results are presented in FIG. 3. As shown in FIG. 3, the viscosity was lowest in the case of Example 1 where the acidic dispersant and the basic dispersant were used in mixture, compared to the cases where the dispersants were individually used. Thus, it can be seen that the status of dispersion was improved.

Experimental Example 3

Figure 4:
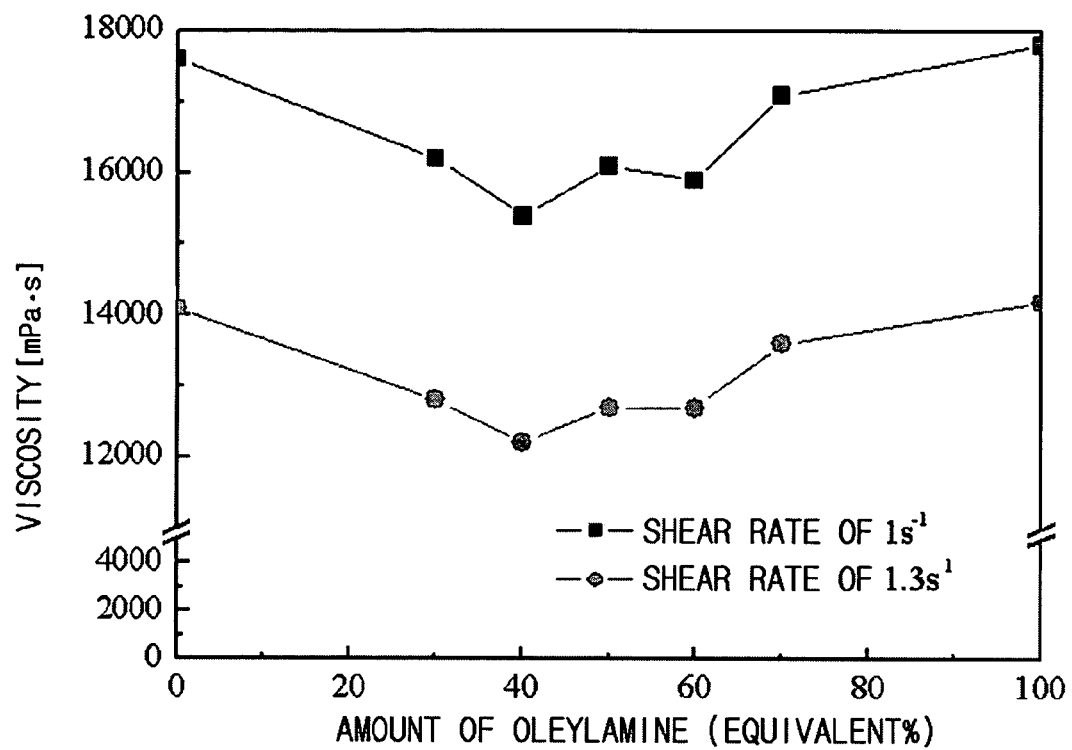
FIG. 4 is a graph showing changes in the viscosity with the respective amounts of the acidic component and the basic component in a mixed dispersant that is present in a proportion of 0.05% by weight in the dispersion according to Example 2 of the present invention.

The viscosities of the dispersions obtained in Example 2 were measured, and the results are presented in FIG. 4. It can be seen from the results of FIG. 4 that the mixed dispersant according to the present invention has a greater dispersion efficiency compared to individual dispersants, and that the viscosity was lowest in the instance where 40 equivalent % of the basic dispersant oleylamine was used in accordance with the acidity of the nickel metal powder surface, and 60 equivalent % of the acidic dispersant oleic acid was used in accordance with the basicity of the nickel metal powder surface. Thus, the quality of the dispersion was the highest.

Experimental Example 4

Figure 5:
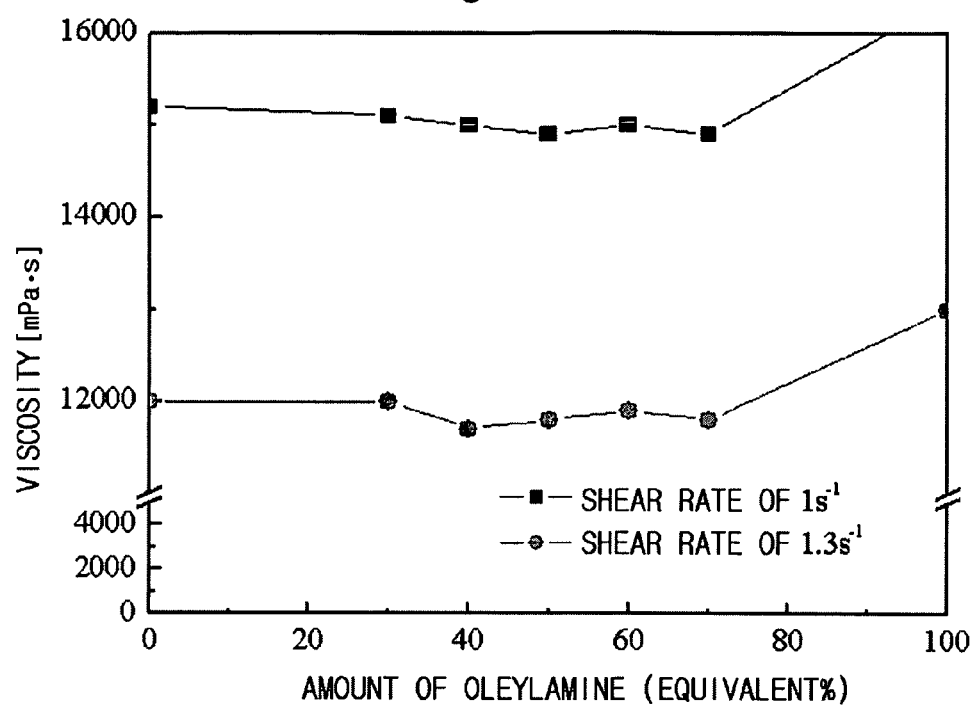
FIG. 5 is a graph showing changes in the viscosity with the respective amounts of the acidic component and the basic component in a mixed dispersant that is present in a proportion of 0.1% by weight in the dispersion according to Example 3 of the present invention.

The viscosities of the dispersions obtained in Example 3 were measured, and the results are presented in FIG. 5. It can be seen from the results of FIG. 5 that when the amount of the mixed dispersant according to the present invention was 0.1% by weight, there were improvements in the dispersion efficiency to a certain degree, but without displaying large differences compared to individual dispersants. It can be seen that when the amount of the dispersant is sufficient, the effect of using the mixed dispersant is not significant.

Experimental Example 5

Figure 6:
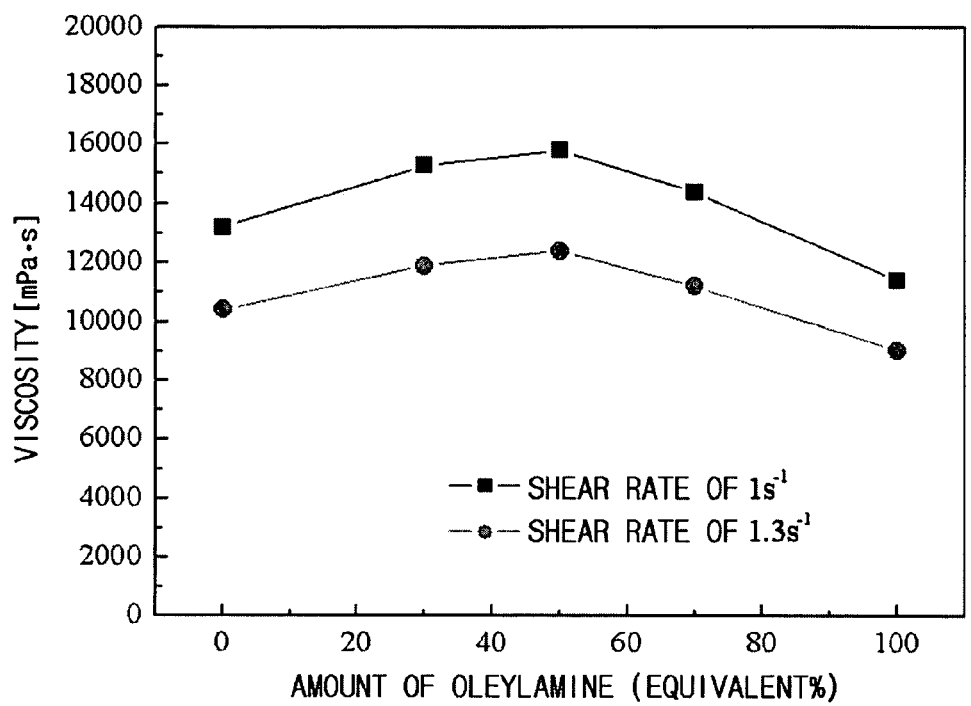
FIG. 6 is a graph showing changes in the viscosity with the respective amounts of the acidic component and the basic component in a mixed dispersant that is present in a proportion of 1% by weight in the dispersion according to Comparative Example 5 of the present invention.

The viscosities of the dispersions obtained in Comparative Example 5 were measured, and the results are presented in FIG. 6. It can be seen from the results of FIG. 6 that when the amount of the mixed dispersant according to the present invention was 1% by weight, the dispersion efficiency decreased compared to the instances where single dispersants were used on an individual basis. It is considered that this decrease in the dispersion efficiency occurs because, upon a use of an excessive amount of the mixed dispersant, the basic dispersant and the acidic dispersant in the mixed dispersant neutralize each other and bind with each other, and thus they become unable to act on the surface of the nickel metal powder.

Figure 7:
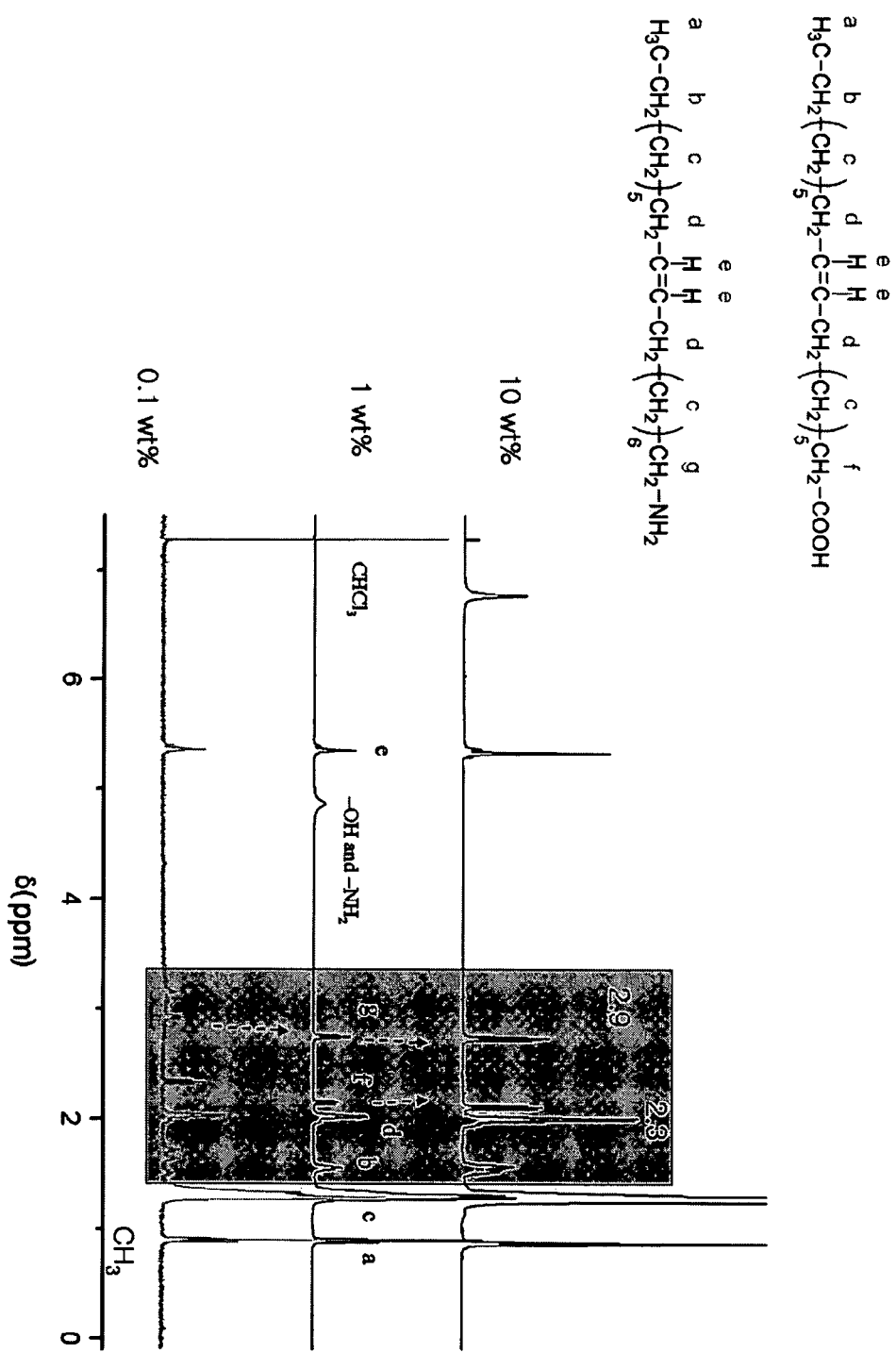
FIG. 7 is a graph showing the NMR results which exhibit the effects exerted by the amount of the mixed dispersant.

An NMR analysis of the dispersions was carried out to confirm the supposition with respect to the amount of the mixed dispersant, and the results are presented in FIG. 7.

FIG. 7 shows the NMR results for dispersions which employ 0.1% by weight, 1% by weight and 10% by weight, respectively, of the mixed dispersant containing 60 equivalent % of oleic acid and 40 equivalent % of oleylamine. It can be seen from the NMR results that when the amount of the mixed dispersant according to the present invention exceeds 0.1% by weight and reaches up to 1% by weight or 10% by weight, oleic acid and oleylamine bind with each other, causing shifts of the peak (g) of oleylamine and of the peak (f) of oleic acid. The shifts imply that a reaction occurred in the vicinity of the carbons corresponding to the positions of peak g and peak f.

Experimental Example 6

Figure 8:
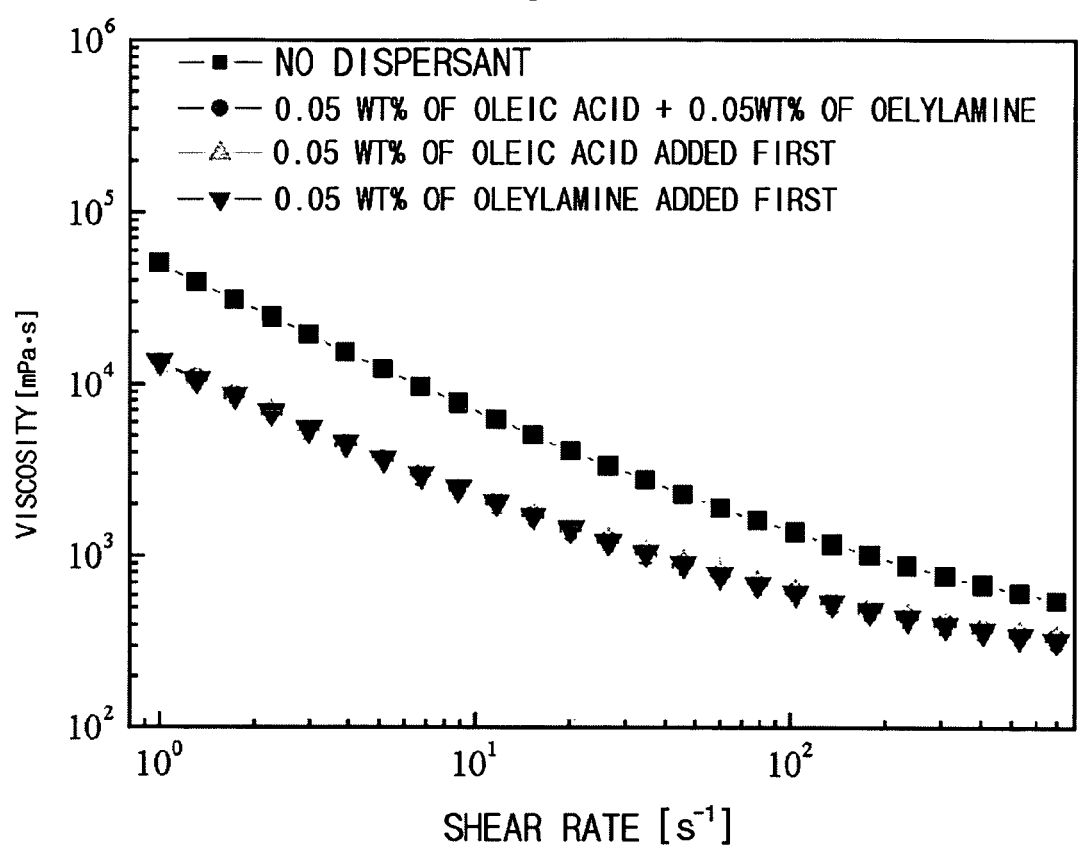
FIG. 8 is a graph comparing the viscosities resulting from different orders of addition of the mixed dispersant components.

In order to measure the dispersing effect of the dispersant with respect to the order of introducing the basic dispersant and the acidic dispersant which constitute the mixed dispersant, 0.05% by weight of oleic acid and 0.05% by weight of oleylamine were introduced to prepare a dispersion in the following manner: (1) oleic acid was added first, and oleylamine was added later; (2) oleylamine was added first, and oleic acid was added later; (3) oleylamine and oleic acid were added simultaneously; and (4) no dispersant was added. Changes in the viscosities of the prepared dispersions with the shear rate were measured, and the results are presented in FIG. 8. As shown in FIG. 8, there was virtually no difference in the dispersing effect due to the order of addition of each component.

Experimental Example 7

Figure 9:
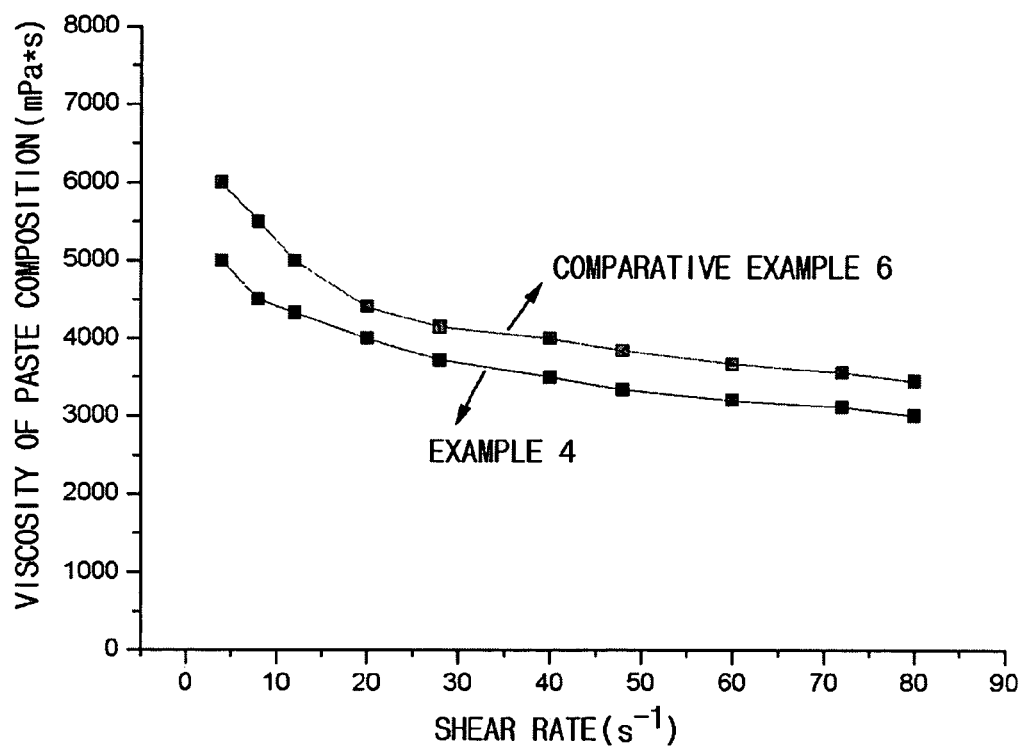
FIG. 9 is a graph showing the viscosity measurement results for the conductive paste compositions according to Example 4 and Comparative Example 6 of the present invention.

The viscosities of the conductive paste compositions obtained in Example 4 and Comparative Example 6 were measured in the same manner as in Experimental Example 1, and the results are presented in FIG. 9. It can be seen from the results of FIG. 9 that the viscosity of the paste composition employing the mixed dispersant according to the present invention is low, and the dispersing effect is excellent.

The mixed dispersant according to the present invention contains a basic dispersant and an acidic dispersant in accordance with the acidity and basicity of nickel metal powder, and thus, can achieve the optimal dispersion efficiency. An improvement in the dispersion efficiency as such allows suppression of aggregation of the nickel metal powder upon the preparation of a conductive paste composition, and therefore a larger amount of the nickel metal powder can be used in the paste composition. The enhanced amount of the nickel metal powder enables the production of an internal nickel electrode having improved electrical properties and mechanical properties during the production of MLCCs.

What is claimed is:

1. A mixed dispersant containing:
   a basic dispersant; and
   an acidic dispersant in accordance with the acidity to basicity ratio at the surface of nickel metal powder,
   wherein the ratio of the amounts of the basic dispersant and the acidic dispersant is about ±30 equivalent % based on the acidity to basicity ratio at the surface of the nickel metal powder.

2. The mixed dispersant of claim 1, wherein the ratio of the amounts of the basic dispersant and the acidic dispersant is about ±20 equivalent % based on the acidity to basicity ratio at the surface of the nickel metal powder.

3. The mixed dispersant of claim 1, wherein the ratio of the amounts of the basic dispersant and the acidic dispersant is about ±10 equivalent % based on the acidity to basicity ratio at the surface of the nickel metal powder.

4. The mixed dispersant of claim 1, wherein the mixing ratio of the mixed dispersant is such that about 30 to 50 equivalent % of the basic dispersant are mixed with about 50 to 70 equivalent % of the acidic dispersant.

5. The mixed dispersant of claim 1, wherein the basic dispersant is an organic base having about 6 to 28 carbon atoms and an amine head group.

6. The mixed dispersant of claim 1, wherein the acidic dispersant is a fatty acid having about 6 to 28 carbon atoms and a carboxyl head group.

7. A conductive paste composition containing:
   a nickel metal powder,
   an organic binder,
   an organic solvent, and
   a mixed dispersant,
   wherein the mixed dispersant contains a basic dispersant and an acidic dispersant in accordance with the acidity to basicity ratio at the metal surface, and
   wherein the proportions of the basic dispersant and the acidic dispersant are each about ±30 equivalent % based on the acidity to basicity ratio at the surface of the nickel metal powder.

8. The conductive paste composition of claim 7, wherein the amount of the mixed dispersant is about 0.001 to 1 part by weight based on 100 parts by weight of the nickel metal powder.

9. The conductive paste composition of claim 7, wherein the mixed dispersant contains about 30 to 50 equivalent % of the basic dispersant and about 50 to 70 equivalent % of the acidic dispersant.

10. The conductive paste composition of claim 7, wherein the basic dispersant is an organic base having about 6 to 28 carbon atoms and an amine head group.

11. The conductive paste composition of claim 7, wherein the acidic dispersant is a fatty acid having about 6 to 28 carbon atoms and a carboxyl head group.

12. A method of dispersing nickel metal powder comprising:
   providing a basic dispersant and an acidic dispersant in accordance with the acidity and basicity at the surface of the nickel metal powder; and
   dispersing the nickel metal powder using the mixed dispersant,
   wherein the proportions of the basic dispersant and the acidic dispersant are each about ±30 equivalent % based on the acidity to basicity ratio at the surface of the nickel metal powder.

13. The method of claim 12, wherein the mixed dispersant contains about 30 to 50 equivalent % of the basic dispersant and about 50 to 70 equivalent % of the acidic dispersant.

14. A multilayer ceramic condenser equipped with internal electrodes that contain the nickel metal powder dispersed by the dispersion method of claim 13.

15. The method of claim 12, wherein the basic dispersant is an organic base having about 6 to 28 carbon atoms and an amine head group.

16. A multilayer ceramic condenser equipped with internal electrodes that contain the nickel metal powder dispersed by the dispersion method of claim 15.

17. The method of claim 12, wherein the acidic dispersant is a fatty acid having about 6 to 28 carbon atoms and a carboxyl head group.

18. A multilayer ceramic condenser equipped with internal electrodes that contain the nickel metal powder dispersed by the dispersion method of claim 17.

19. A multilayer ceramic condenser equipped with internal electrodes that contain the nickel metal powder dispersed by the dispersion method of claim 12.

20. A multilayer ceramic condenser equipped with internal electrodes that contain the nickel metal powder dispersed by the dispersion method of claim 12.

* * * * *